(12) United States Patent
Takahashi (10) Patent No.: US 7,864,214 B2
(45) Date of Patent: Jan. 4, 2011

(54) SIGNAL PROCESSING DEVICE

(75) Inventor: Fuminori Takahashi, Nagano (JP)

(73) Assignee: Nittoh Kogaku K.K., Nagano (JP)

( * ) Notice: Subject to any disclaimer, the term of this patent is extended or adjusted under 35 U.S.C. 154(b) by 388 days.

(21) Appl. No.: 12/278,340

(22) PCT Filed: Apr. 24, 2007

(86) PCT No.: PCT/JP2007/051033

§ 371 (c)(1),
(2), (4) Date: Aug. 5, 2008

(87) PCT Pub. No.: WO2007/091422

PCT Pub. Date: Aug. 16, 2007

(65) Prior Publication Data

US 2009/0051775 A1    Feb. 26, 2009

(30) Foreign Application Priority Data

Feb. 6, 2006    (JP) ............................. 2006-028006

(51) Int. Cl.
*H04N 5/228* (2006.01)
(52) U.S. Cl. ................. 348/208.4; 348/222.1
(58) Field of Classification Search .............. 348/208.4, 348/222.1
See application file for complete search history.

(56) References Cited

U.S. PATENT DOCUMENTS 5,444,509 A    8/1995   Ohishi

2002/0167597 A1    11/2002   Nakano et al.
2009/0225200 A1*   9/2009   Ohki ........................... 348/241

FOREIGN PATENT DOCUMENTS

| JP | 06-317824 A | 11/1994 |
| JP | 11-024122 A | 1/1999 |
| JP | 2002-300459 A | 10/2002 |
| JP | 2003-060916 A | 2/2003 |

* cited by examiner

*Primary Examiner*—James M Hannett
(74) *Attorney, Agent, or Firm*—Cowan, Liebowitz & Latman, P.C.; Mark Montague (57) ABSTRACT

A signal processing device includes a system of circuit processing in essence while avoiding large sized device under restoring fluctuated signals such as deterioration and the like. The signal processing unit includes a processing unit that restores one of a signal before fluctuation, a signal which should have been intrinsically obtained, and signal data which is approximated from these signals from an initial signal which has fluctuated like deterioration. A fluctuated data region storing fluctuated data and a restored data region storing signal data (restored data) restored every restoring process are installed. The processing unit repeats the following processes in order to produce data formed in the restored data region at the completion of processing as original signal data. The processing unit transfers energy of the fluctuated data from the fluctuated data region to the restored data region using fluctuation-factor information data, which is a fluctuation factor, and produces restored data; and substitutes residual data in the fluctuated data region remained through the data transfer for the fluctuated data.

16 Claims, 10 Drawing Sheets

| Pixel | S−1 | S | S+1 | S+2 | S+3 |
|---|---|---|---|---|---|
| Strength distribution | 0.0 | 1.0 | 0.0 | 0.0 | 0.0 |

Fig.5

| Pixel | S−3 | S−2 | S−1 | S | S+1 | S+2 | S+3 | S+4 |
|---|---|---|---|---|---|---|---|---|
| Image shot result | 120 | 60 | 80 | 100 | 150 | 80 | 120 | 180 |

Fig.6

| Pixel | S−1 | S | S+1 | S+2 | S+3 |
|---|---|---|---|---|---|
| Energy dispersion ratio | 0 | $\alpha$ | $\beta$ | $\gamma$ | 0 |
| Strength distribution | 0 | 0.5 | 0.3 | 0.2 | 0 |

Fig.7

| Pixel | S-3 | S-2 | S-1 | S | S+1 | S+2 | S+3 | S+4 |
|---|---|---|---|---|---|---|---|---|
| Original pixel data | 120 | 60 | 80 | 100 | 150 | 80 | 120 | 180 |
| Status of blurred energy dispersion | 60 | 36 | 24 | 0 | 0 | 0 | 0 | 0 |
| | 0 | 30 | 18 | 12 | 0 | 0 | 0 | 0 |
| | 0 | 0 | 40 | 24 | 16 | 0 | 0 | 0 |
| | 0 | 0 | 0 | 50 | 30 | 20 | 0 | 0 |
| | 0 | 0 | 0 | 0 | 75 | 45 | 30 | 0 |
| | 0 | 0 | 0 | 0 | 0 | 40 | 24 | 16 |
| | 0 | 0 | 0 | 0 | 0 | 0 | 60 | 36 |
| | 0 | 0 | 0 | 0 | 0 | 0 | 0 | 90 |
| Initial image data (initial image pixel energy E) | 60 | 66 | 82 | 86 | 121 | 105 | 114 | 142 |

Fig.8

| Initial image pixel energy E for each pixel | | S−3 | S−2 | S−1 | S | S+1 | S+2 | S+3 | S+4 |
|---|---|---|---|---|---|---|---|---|---|
| | | 60 | 66 | 82 | 86 | 121 | 105 | 114 | 142 |
| Transferring process for "S−3" | $F_1(S-3)$ | 60 | 0 | 0 | 0 | 0 | 0 | 0 | 0 |
| | $R_1(S-3)$ | 60 | 0 | 0 | 0 | 0 | 0 | 0 | 0 |
| | $T_1(S-3)$ | 30 | 18 | 12 | 0 | 0 | 0 | 0 | 0 |
| | $E_1(S-3)$ | 30 | 48 | 70 | 86 | 121 | 105 | 114 | 142 |
| Transferring process for "S−2" | $F_1(S-2)$ | 0 | 48 | 0 | 0 | 0 | 0 | 0 | 0 |
| | $R_1(S-2)$ | 60 | 48 | 0 | 0 | 0 | 0 | 0 | 0 |
| | $T_1(S-2)$ | 0 | 24 | 14.4 | 9.6 | 0 | 0 | 0 | 0 |
| | $E_1(S-2)$ | 30 | 24 | 55.6 | 76.4 | 121 | 105 | 114 | 142 |
| Transferring process for "S−1" | $F_1(S-1)$ | 0 | 0 | 55.6 | 0 | 0 | 0 | 0 | 0 |
| | $R_1(S-1)$ | 60 | 48 | 55.6 | 0 | 0 | 0 | 0 | 0 |
| | $T_1(S-1)$ | 0 | 0 | 27.8 | 16.68 | 11.12 | 0 | 0 | 0 |
| | $E_1(S-1)$ | 30 | 24 | 27.8 | 59.72 | 109.88 | 105.00 | 114.00 | 142.00 |
| Transferring process for "S" | $F_1(S)$ | 0 | 0 | 0 | 59.72 | 0 | 0 | 0 | 0 |
| | $R_1(S)$ | 60 | 48 | 55.6 | 59.72 | 0 | 0 | 0 | 0 |
| | $T_1(S)$ | 0 | 0 | 0 | 29.86 | 17.92 | 11.94 | 0 | 0 |
| | $E_1(S)$ | 30 | 24 | 27.8 | 29.86 | 91.96 | 93.06 | 114.00 | 142.00 |
| Transferring process for "S+1" | $F_1(S+1)$ | 0 | 0 | 0 | 0 | 91.96 | 0 | 0 | 0 |
| | $R_1(S+1)$ | 60 | 48 | 55.6 | 59.72 | 91.96 | 0 | 0 | 0 |
| | $T_1(S+1)$ | 0 | 0 | 0 | 0 | 45.98 | 27.59 | 18.39 | 0 |
| | $E_1(S+1)$ | 30 | 24 | 27.8 | 29.86 | 45.98 | 65.47 | 95.61 | 142.00 |
| Transferring process for "S+2" | $F_1(S+2)$ | 0 | 0 | 0 | 0 | 0 | 65.47 | 0 | 0 |
| | $R_1(S+2)$ | 60 | 48 | 55.6 | 59.72 | 91.96 | 65.47 | 0 | 0 |
| | $T_1(S+2)$ | 0 | 0 | 0 | 0 | 0 | 32.73 | 19.64 | 13.09 |
| | $E_1(S+2)$ | 30 | 24 | 27.8 | 29.86 | 45.98 | 32.73 | 75.97 | 128.91 |
| Transferring process for "S+3" | $F_1(S+3)$ | 0 | 0 | 0 | 0 | 0 | 0 | 75.97 | 0 |
| | $R_1(S+3)$ | 60 | 48 | 55.6 | 59.72 | 91.96 | 65.47 | 75.97 | 0 |
| | $T_1(S+3)$ | 0 | 0 | 0 | 0 | 0 | 0 | 37.98 | 22.79 |
| | $E_1(S+3)$ | 30 | 24 | 27.8 | 29.86 | 45.98 | 32.73 | 37.98 | 106.12 |
| Transferring process for "S+4" | $F_1(S+4)$ | 0 | 0 | 0 | 0 | 0 | 0 | 0 | 106.12 |
| | $R_1(S+4)$ | 60 | 48 | 55.6 | 59.72 | 91.96 | 65.47 | 60.77 | 106.12 |
| | $T_1(S+4)$ | 0 | 0 | 0 | 0 | 0 | 0 | 0 | 53.06 |
| | $E_1(S+4)$ | 30 | 24 | 27.8 | 29.86 | 45.98 | 32.73 | 37.98 | 53.06 |

SIGNAL PROCESSING DEVICE

This application is based upon and claims the benefit of priority from Japanese Patent Application No. 2006-028006, filed on Jun. 2, 2006, disclosure of which is incorporated herein in its entirety by reference.

FIELD OF THE INVENTION

The present invention relates a signal processing device.

BACKGROUND OF THE INVENTION

It is conventionally known that an image is blurred when taking a picture with a signal processing device such as camera and the like. A blur of an image is mainly due to hand jiggling (camera shaking) when taking a picture, various aberrations in optics, lens distortion and the like.

In order to stabilize an image, there are two methods, moving lens and electronic processing. As a method of moving a lens, for example, the patent document 1 discloses a method of stabilizing an image by detecting hand jiggling and moving a predetermined lens in response to hand jiggling. As a method of electronic processing, the document 2 discloses a method of producing a restored image by detecting displacement of a camera's optical axis with an angular velocity sensor, gaining a transfer function showing a blurry state when taking a picture from detected angular velocity, and inversely transforming the barycenter value Ga of the point spread transfer function about a shot image.

Further, signals from a sound, an x-ray photograph, a microscopic picture, an earth quake wave form and the like except a general shot image might have been also blurred and deteriorated due to fluctuation and other causes.

[Patent Document 1]

Japanese patent publication 6-317824 A (see the summary)

[Patent Document 2]

Japanese patent publication 11-24122A (see the summary)

A camera, equipped with a method of stabilizing an image shown in the patent document 1, becomes a large size because of necessity of a space for mounting hardware such as a lens such as motor and the like. Further, installing such hardware and a driving circuit needs to increase a cost. On the other hand, a method of stabilizing an image shown in the patent document 2 includes following issues, although the method does not have the above mentioned issue. Namely, following two issues cause difficulty of producing a restored image in actual; though inversed transformation of the barycenter value Ga of the point spread transfer function theoretically produces a restored image.

First, the gained point spread transfer function is extremely weak in handling noises and information errors about a blur and slight variation of them greatly affects the values of the function. This variation results in a disadvantage in that a restored image produced by the inversed transformation is far from a stabilized image without hand jiggling and out of use in actual. Second, the inverse transformation factoring noises sometime needs a method of estimating solutions by using singular value decomposition about solutions in simultaneous equations. But calculated values for such estimation run into astronomical numbers, actually yielding a high risk of remaining unsolved.

These issues regarding an image emerge from general various kinds of signal data. It is difficult to restore a signal by using the inverse transformation if the gained transfer function is inaccurate or even if it is accurate. Further, it is impossible to gain a perfectly accurate transfer function if processing objects in nature.

OBJECTS AND SUMMARY OF THE INVENTION

The advantage of the invention is to provide a signal processing device realizing a practical image processing of restoring image data as well as preventing the device from becoming a large size.

According to an aspect of the invention, a signal processing device comprises:

an processing unit that restores one of a signal before fluctuation, a signal which should have been intrinsically obtained, and signal data which is approximated to these signals (these signals are called as an original signal data) from an initial signal (called as fluctuated data) which has fluctuated like deterioration. A fluctuated data region storing fluctuated data and a restored data region storing signal data (restored data) restored every restoring process are installed. The processing unit repeats the following processes for producing data in the restored data region at the process completion as original signal data. Namely, the processing unit transfers energy of the fluctuated data from the fluctuated data region to the restored data region using fluctuation-factor information data, which is a fluctuation factor, so as to produce restored data; and substitutes residual data in the fluctuated data region remained through the data transfer with the fluctuated data.

In this aspect of the invention, it is premised that the original signal data is changed to the fluctuated data accompanied with the fluctuation-factor information data. Hence, using the fluctuation-factor information data as the same filter can certainly restore the original signal in the restored data region if the energy of the fluctuated data is transferred to the restored data region. Here, the fluctuated data stored in the fluctuated data region may be data obtained by processing the fluctuated data with keeping the energy state constituting the fluctuated data unchanged. The restored data stored in the restored data region may be data obtained by processing the restored data with keeping the energy sate constituting the restored data unchanged. Further, "transfer" includes transfer of energy value as literal interpretation from the fluctuated data region to the restored data region, removing the energy from the fluctuated data region and producing new energy in the restored data region. Further, the fluctuated data region and the restored data region include a region temporarily formed or permanently formed or both of them (the same hereafter.)

In addition to the aspect of the invention, during the repeating process, the energy transferred to the restored data region may be added to the restored data already stored in the restored data region every repeating and the residual data is approximated to zero. If the residual data approaches zero, most energy in the fluctuated data region is transferred to the restored data region, approaching the restored data to the original data.

According to other aspect of the invention, a signal processing device comprises: a processing unit that restores original signal data including a plurality of elements from fluctuated data including a plurality of elements. A fluctuated data region storing fluctuated data and a restored data region storing data restored every restoring process are installed. The processing unit repeats the following processes for each element. Namely, the processing unit transfers elemental energy existed in one element of the fluctuated data from the fluctuated data region to the restored data region using the barycenter of response characteristic function held by fluctuation-factor information data, which is a fluctuation factor; removes the element energy corresponding to the transferred element energy using fluctuation-factor information data from the fluctuated data region; applies the previous processes to other element in series so as to produce restored data in the restored data region; and substitutes residual data in the fluctuated data region remained through the removing with the fluctuated data. Further, the processing unit adds the element energy transferred to the restored data region to the restored data every repeating, approaches the residual data to zero and produces data formed in the restored data region at the completion of the processes as original signal data.

In the other aspect of the invention, it is premised that the original data signal is changed to the fluctuated data accompanied with the fluctuation-factor information data. Most energy of fluctuated data is transferred to the restored data region using inversed numbers of the barycenter values (values in an area where energy is mostly concentrated) of response characteristic function held by fluctuation-factor information data, which is the same filter. The element energy corresponding to the transferred element energy is removed using fluctuation-factor information data from the fluctuated data region and the energy value of residual data (called as residual energy amount) approaches to zero. These processes can certainly restore the original signal data in the restored region. Here, the fluctuated data stored in the fluctuated data region may be data obtained by processing the fluctuated data with keeping the energy state of each element constituting the fluctuated data unchanged. The restored data stored in the restored data region may be data obtained by processing the restored data with keeping the energy state of each element constituting the restored data unchanged. Further, "transfer" includes transfer of energy value as literal interpretation from the fluctuated data region to the restored data region, removing the energy from the fluctuated region and producing new energy corresponding to the energy in the restored data region. Further, the response characteristic function includes an impulse response function and a unit response function. The impulse response function becomes a point spread function if signal data is image data.

In addition to the other aspect of the invention, the processing unit may halt processing during repeating the processing if the amount of residual energy becomes equal to or less than the predetermined value. This halt can avoid long time processing since the processing is stopped before the amount of residual energy becomes "zero". Further, setting the amount of residual energy under a predetermined value can make restored data further approach to original signal data before fluctuation (before deteriorating) which is the base of fluctuated data. Further, even when yielding noises may bring a situation of the amount of residual energy "zero", which is not actually happened, the above halt can avoid unlimited repetition of the processing.

In addition to the other aspect of the invention, the processing unit may halt the processing during repeating the processing if the numbers of the repetition becomes the predetermined value. This halt can avoid long time processing since the processing is stopped before the amount of residual energy becomes "zero". Further, the processing is repeated until the predetermined numbers. This repetition can make approximated restored data further approach to original signal data before deteriorating, which will be a base for fluctuated signals. Further, even when yielding noises may bring a situation of the amount of residual energy non "zero", which is actually happened, the above halt can avoid unlimited repetition of the processing.

Further, in addition to the other aspect of the invention, during the repetition of the processing, the processing unit may halt the repetition if the amount of residual energy at the time when the numbers of repetition reaches the predetermine number are equal to or less or smaller than the predetermined value, and may continue the repetition by the predetermined number if the amount of residual energy are equal to or more or larger than the predetermined value. In this additional aspect of the invention, associating the number of process repetition with the value of the amount of residual energy can attain favorite balance between the accuracy of restoration and processing time compared to a case of simply limiting the number of repetition or a case of limiting the amount of residual energy.

According to yet other aspect of the invention, a signal processing device comprises a processing unit that restores original signal data including a plurality of elements from fluctuated data including a plurality of elements. A fluctuated data region storing fluctuated data and a restored data region storing data restored every restoring process are installed. The processing unit repeats the following processes and adds energy, which is transferred to the restored data region every repetition, to the restored data: Namely, the processing unit transfers energy existed in one element of the fluctuated data from the fluctuated data region to the restored data region using fluctuation-factor information data, which is a fluctuation factor; removes the energy corresponding to the transferred energy using fluctuation-factor information data from the fluctuated data region; applies the previous processes to other element in series so as to produce restored data in the restored data region; halts the processing if the value of the residual energy remained in the fluctuated data region through the transfer is equal to or less or smaller than a predetermined value and treats the restored data as the original signal data; and substitutes the residual data with the fluctuated data if the amount of the residual energy is equal to or more or larger than the predetermined value.

In the yet other aspect, it is premised that the original signal data is changed to the fluctuated data accompanied with the fluctuation-factor information data. Hence, using the fluctuation-factor information data as the same filter can certainly restore the original signal in the restored data region if the energy of the fluctuated data is transferred to the restored data region. Further, restoring can be quickly processed since energy is transferred from the fluctuated data region to the restored data region using fluctuation-factor information data and the residual data is substituted with the fluctuated data only if the amount value of the residual energy in each element of the fluctuated data region is equal to or more or larger than the predetermined value and the same processing is repeated. Further restoring is processed by transferring energy from the fluctuated data region to the restored data region, mostly avoiding an increase of additional hardware and large sized device. Hence, these processes can provide a signal processing device that includes a system of circuitry for processing to restore signals in essence.

In addition to the yet other aspect of the invention, the processing unit may halt the processing during repeating the processing if the numbers of the repetition becomes the predetermined numbers. This halt can avoid long time processing since the processing is stopped before the amount of remained energy becomes "zero" or not. Further, the processing may be continued until a predetermined number, making the restored data be further close to the original data. When yielding noises may bring a situation of the amount of residual energy non "zero", which is actually happened, the processing is repeated unlimitedly. But the above halt can avoid such unlimited repetition.

In addition to the yet other aspect of the invention, the processing unit compares one of the maximum value, the average value and the total sum of the residual data held by each element or plurality of them with a predetermined value. Such comparison can approaches the amount of the residual energy in each element constituting the fluctuated data to zero, improving approximation accuracy between the restored data and the original data.

In addition to the other aspect of the invention, during transferring element energy any times of the repetition, the processing unit may not transfer the element energy in a specific time if the element energy value in any elements of the residual energy is under zero and transfers the element energy in the following time instead or corrects the transfer value in the specific time. Such transfer or correction can improve restoring accuracy of an image since a situation, which is not theoretically occurred, can be avoided. Namely, in the situation, the element energy value in any element of the residual energy is under zero as the result of transfer of energy.

In addition to the yet other aspect of the invention, signal data may be image data. Hence, this feature can restore one of an image before fluctuation, an image which has been intrinsically shot, and/or an image which is approximated to these images (called as a original image hereafter).

An advantage of the invention is to provide a signal processing device including a system of circuit processing in essence while avoiding large sized device under restoring fluctuated signals such as deterioration and the like.

BRIEF DESCRIPTION OF THE DRAWINGS

FIG. 9 is a diagram explaining the method shown in FIG. 3 as exemplifying image data deteriorated by hand jiggling shown in FIG. 8.

DETAILED DESCRIPTION OF THE PRESENT INVENTION

The following reference numerals are used in the following description of the present invention.
1: signal processing device,
2: signal receiving unit (imaging unit),
3: control unit,
4; processing unit,
5; recording unit,
6; detecting unit,
7; factor information storing unit,
G; fluctuation-factor information data (data of information about deterioration factors),
Ga; barycenter value of point spread function,
Img'; initial image data (shot image),
Img; data of correct and intrinsic image without blurring (original image),
E; initial image pixel energy,
$F_n$: transferred pixel energy,
$R_n$: restored energy,
cE; correction energy,
$E_n$: residual energy amount (object energy to be processed),
$E_{max}$: maximum value of residual energy amount,
X; predetermined value of residual energy amount,
$T_n$: pixel energy amount removed from original image data region, A signal processing unit 1 according a first embodiment of the invention will be explained with referring to figures hereafter. The signal processing unit 1 is an image processing unit used for a consumer camera in the embodiment, but also applied to cameras for other use such as monitoring, TV, handy video cameras and endoscopes, and other devices except cameras such as a microscope, binoculars, and a diagnostic imaging apparatus like imaging with NMR.

Figure 1:
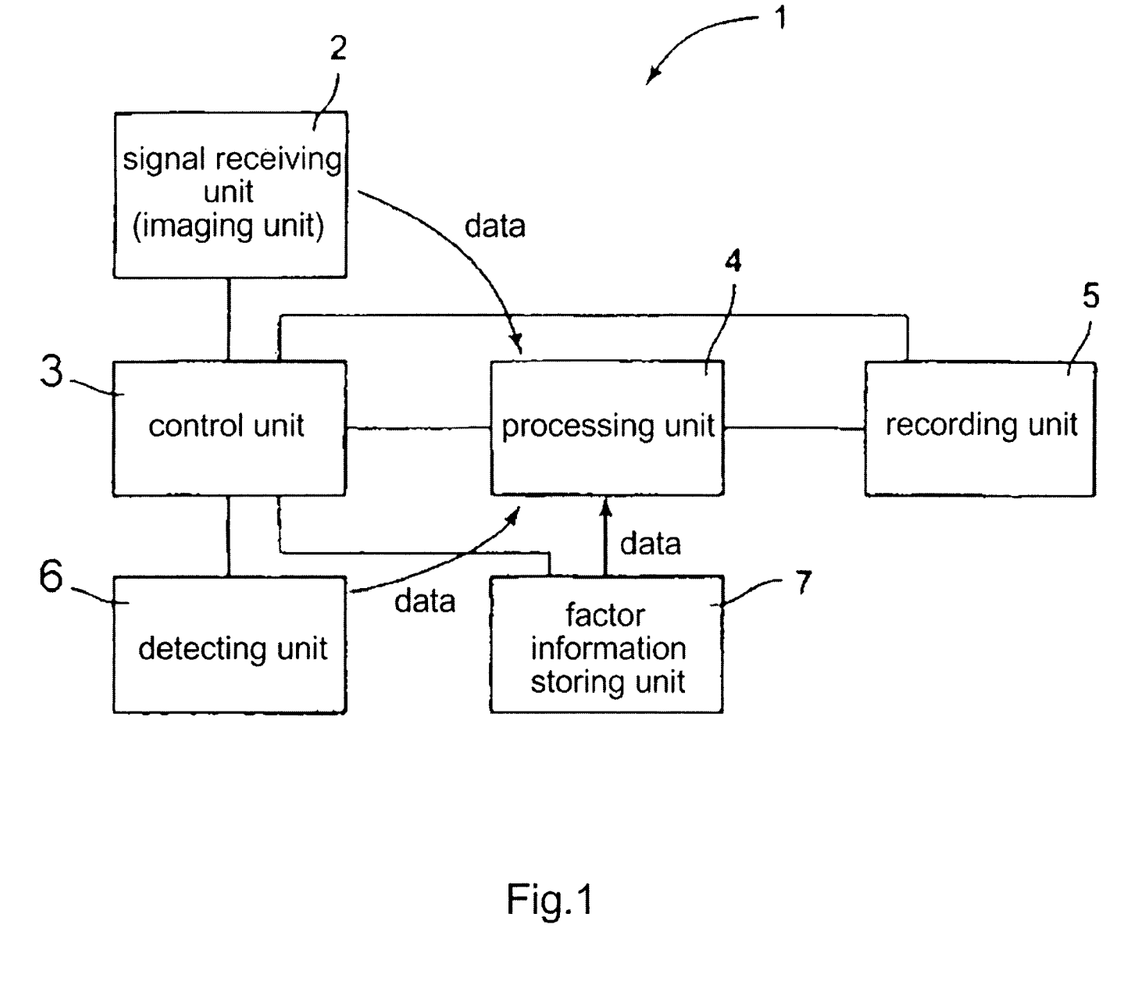
FIG. 1 is a block diagram showing main components of a signal processing unit of the invention.

FIG. 1 is a brief overview of a signal processing device 1. The signal processing device 1 comprises an imaging unit 2 for shooting an image such as a figure, a controller 3 for driving the imaging unit 2 and a processing unit 4 for processing an image shot by the imaging unit 2. The signal processing device 1 further comprises a recording unit 5 for recording an image processed by the processing unit 4, a detector 6 composed of an angular velocity sensor, or the like for detecting fluctuation factor information, which is a main factor for an image blur, and a fluctuation-factor information storing unit 7 which stores the existed fluctuation-factor information causing an image blur and the like. Here, if the signal processing device 1 is applied to a device except a image processing device, the imaging unit 2 is differentiated from a signal receiving unit 2 that receives various input signals such as voice signals (the imaging unit 2 is arbitrarily differentiated from the signal receiving unit 2 hereafter.))

The imaging unit 2 is a part including an optical system for imaging and having lens and an imaging sensor for converting light passed through lenses into electrical signals such as CCD, C-MOS and the like. The controller 3 controls each of units such as the imaging unit 2, the processing unit 4, the recording unit 5, the detector 6, the fluctuation-factor information storing unit 7 and the like within the signal processing device 1.

The processing unit 4 includes an image processing processor composed of hardware such as application specific integrated circuit (ASIC). The processing unit 4 produces sampling frequencies for detecting shaking such as hand jiggling and the like and supplies such sampling frequencies to the detector 6. Further, the processing unit 4 controls starting and ending of shaking detection. Here, if the signal processing device 1 is applied to a device except a signal processing device, the receiving sensitivity of the signal receiving unit 2 can be varied depending on the amplitude of input signals.

The processing unit 4 may comprise software instead of hardware like ASIC. The processing unit 4 permanently includes an initial image data region as a fluctuated data region and a restored data region. Further, the processing unit 4 memorizes the maximum value "$E_{max}$" of a residual energy amount for each pixel described later. The recording unit 5 includes a semiconductor memory, but may include a magnetic recording means like a hard disk drive or an optical recording means like a digital versatile disk (DVD). Here, the recording unit 5 may include a fluctuated data region and a restored data region, and memorize the maximum value "$E_{max}$" of a residual energy amount.

Figure 2:
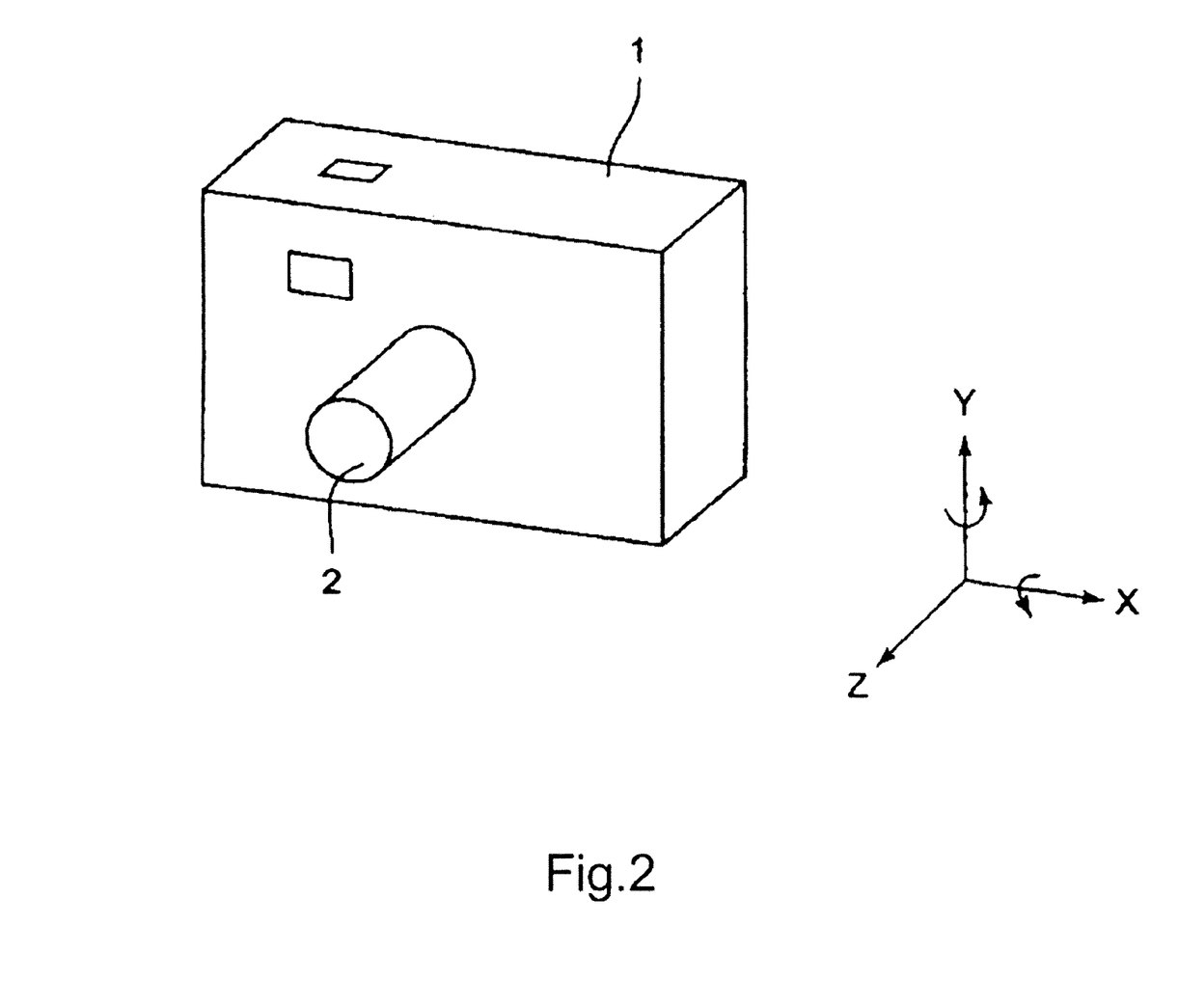
FIG. 2 is a perspective and schematic view showing an overall concept of the signal processing device shown in FIG. 1 and the location of an angular velocity sensor.

The detecting unit 6 is provided with two angular velocity sensors, detecting the angular velocity along X axis and Y axis perpendicular to Z axis, which is the optical axis of the signal processing device 1 as shown in FIG. 2. Hand jiggling when shooting an image with a camera causes any movements along X, Y and Z directions and rotation along Z axis. But, in particular, rotations along X and Y axes receive the most impact of the hand jiggling. A shot image is greatly blurred even if these rotations fluctuate slightly. Only two angular sensors are placed along X and Y axes in FIG. 2 in the embodiment due to the above reason. But, other angular sensor along Z axis and sensors detecting movement along X and Y directions may be added in order to get further accurate detection. A sensor may be an angler acceleration sensor instead of an angler velocity sensor.

The fluctuation-factor information storing unit 7 is a recording unit storing fluctuation-factor information such as existed deterioration-factor information, of which examples are optical aberration and/or a point spread function calculated based on detected fluctuation. The point spread function recorded by the fluctuation-factor information storing unit 7 is used for restoring an initial image as an fluctuated image such as deterioration, which was shot directly after its calculation for example by the processing unit 4. Here, timing of restoring an initial image can be timing of being delayed from the time of shooting an initial image such as timing when power for imaging is turned off, timing when the processing unit 4 is not activated or timing when the operation duty of the processing unit 4 is low. In such case, initial image data recorded in the recording unit 5 and fluctuation-factor information such as the point spread function and the like about its initial image recorded in the fluctuation-factor information storing unit 7 are stored for long time under a state where these data and information are made to be related each other. Accordingly, making timing of restoring an initial image be timing of being delayed from time of shooting an initial image shows an advantage in that a load of the processing unit 4 for various processing at the time of shooting can be reduced. Here, in a case when the signal processing unit 1 is applied as a unit except an image processing unit, temperature, humidity and the like detected by the detection unit 6 may vary the receiving characteristics of the signal receiving unit 2 and the characteristics of an entire system. In such case, these variations may be recorded and used for fluctuation factor information. Further, response characteristics functions and the like of a system which was already known such as impulse response and the like of the system may be recorded in the fluctuation-factor information storing unit 7.

Next, a concept of a method of image restoring performed by the processing unit 4 in the signal processing unit 1 will be explained as an example with referring to FIG. 3.

Figure 3:
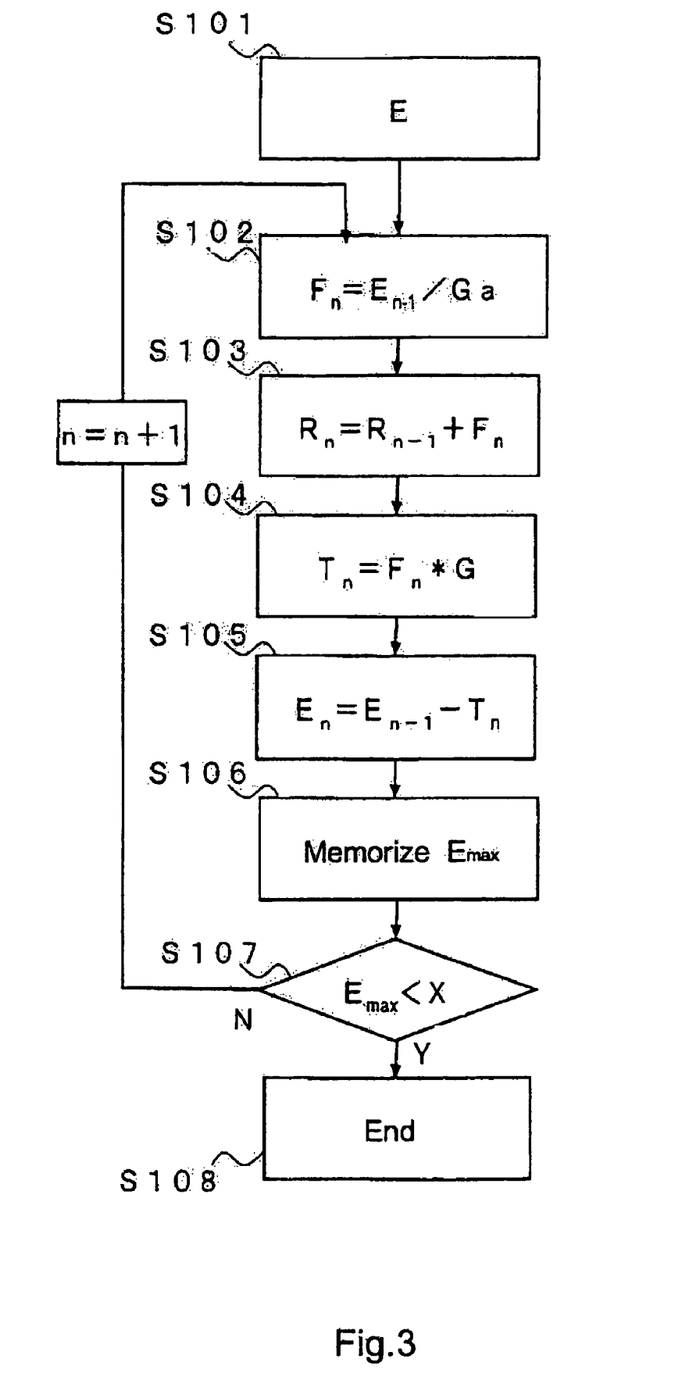
FIG. 3 is a flow chart showing a processing routine regarding a method of restoring an image (repetition processing) implemented by a signal processing unit in the signal processing device shown in FIG. 1.

In FIG. 3, "E" is light energy (initial image pixel energy) held by each pixel of initial image data Img' (details will be described alter) as fluctuated data such as deterioration and stored in the initial image data region as the fluctuated data region. "$F_n$" is pixel energy (transfer pixel energy hereafter) transferred from the initial image data region as n-th times fluctuated data region to the restored image data region as restored data region. "$E_n$" is a residual energy amount remained in the initial image data region as fluctuated data region due to the transfer of the n-times transfer energy $F_n$ from 1st time to n-th time. This energy amount is energy to be processed. "$R_n$" is restored data stored in the restored image data region as the restored data region and becomes the data approximated to the original data "Img" by performing restoring process shown in FIG. 3. "X" is a predetermined value of the residual energy amount $E_n$. "G" is fluctuation-factor information data (=information about deterioration factors (point spread functions)) detected by the detector 6 and stored by the recording unit in the processing unit 4. "Ga" is a barycenter value of the point spread function of the fluctuation-factor information data G (=information about deterioration factor (a point spread function)) detected by the detector 6. "Img" is original image data, namely image data which has been intrinsically shot, and original signal data. Here, the original signal data includes not only the original image Img (the signal which has been intrinsically obtained), but signal before fluctuation and data approximated to these signals. The initial image data Img' is a shot image, namely deteriorated image data. Here the relationship between Img and Img' is assumed to be expressed as the following formula (1).

$$Img'=Img*G \tag{1}$$

Where, "*" is an operator which indicates convolution integration.

Further, "$T_n$" is an amount of pixel energy obtained by removing the pixel energy corresponding to the transfer pixel energy $F_n$ from the initial image data region and becomes an amount equal to the transfer pixel energy $F_n$. "$E_{max}$" is a maximum value of residual energy amount for each pixel in the initial image data region. Here, the relationship between the residual energy amount $E_n$ for each pixel in the initial image data region and the transfer pixel energy $F_n$ is assumed to be expressed as the following formula (2). Namely, the transfer pixel energy $F_n$ is obtained by multiplying the residual energy amount $E_n$ (energy to be processed) for each pixel in the initial image data region with the inversed numbers of the barycenter value Ga of the point spread function of the fluctuation-factor information data G.

$$F_n=E_n/Ga \tag{2}$$

According to the process routine of the processing unit 4 in FIG. 3, a pixel energy for each pixel constituting the initial image data Img' is extracted as the initial image pixel energy E in the beginning (step S101). Here, in the current status (n=0), $E_0$=E (initial image data) and the restored data in the restored image data region $R_0$=0. In first processing (n=1), the initial image pixel energy E=$E_0$ is multiplied with the inverse numbers of the barycenter value Ga of the point spread function (the maximum value of the fluctuation-factor information data G) to obtain the transfer pixel energy $F_1$ (step S102.) Next, the transfer pixel energy $F_1$ is transferred to the restored data $R_1$ in the restored image data region. Namely, the transfer pixel energy $F_1$ is added to the restored data $R_0$ in the restored image data region to obtain the first restored data $R_1$ (step S103).

Next, a pixel energy which is equal to the transfer pixel energy $F_1$ transferred to the restored image data region is removed from the initial image data region. In such case, the point spread function as the fluctuation-factor information data G is utilized. The reason of using such function is that deterioration of data depends on passing through a filter such as the fluctuation-factor information data G and the transfer pixel energy $F_n$ can be removed from the initial image data region without any inconsistency before and after the deterioration. Then, the pixel energy amount $T_1$ obtained by convolving the transfer pixel energy $F_n$ with the fluctuation-factor information data G (step S104) is removed from the initial image data region to obtain the residual energy amount $E_1$ in the initial image data region as a residual energy (step S105.)

These steps S102, S103, S104, and S105 are performed in series for all remained pixels constituting the initial image data Img' in the initial image data region. At this time, the energy $E_0$ which is an object to be processed in the step S102 becomes a value attained by removing of the amount obtained through the convolution when the transfer pixel energy $F_n$ is removed from the initial image data region during transfer process of peripheral pixel energies. Then, after these steps S102, S103, S104 and S105 are completed for all pixels, the maximum value $E_{max}$ of the residual energy amount $E_1$ in the initial image data region is memorized (step S106.)

Next, it is determined whether the maximum value $E_{max}$ of the residual energy amount $E_1$ is under the predetermined value X or not (step S107.) Namely it is determined whether most of the initial image pixel energy $E=E_0$ which was initially remained in the initial image data region is transferred to the restored image data region and the restored data $R_1$ in the restored image data region is regarded as the original image data Img or not. In the embodiment, the predetermined value X is set to be a value approximated to "0" except "0". It is determined whether the maximum value $E_{max}$ is under the predetermined value X or not. If the maximum value $E_{max}$ is equal to or more than the predetermined value X, steps S102, S103, S104, S105 and S106 are performed again for all pixels as "n=n+1"=2. In the processes of FIG. 3, the process "n=n+1" is performed when steps S106 and S107 are performed after steps S102, S103, S104, and S105 are completed for all pixels, Namely, the numbers of the processing for an entire image is expressed as "n". Here, in step S107, it may be determined to count the numbers of pixels having the residual energy amount $E_n$ which is equal to or more than the predetermined value X. In such case, even if there exist some numbers of pixels having the residual energy amount $E_n$ which is equal to or more than the predetermined value X, the restored data $R_1$ is regarded to be sufficiently approximated to the original image data Img if the numbers of such pixels are small.

In step S107, a process in a case when the maximum value E max is equal to or more than the predetermined value X will be explained. Steps S102, S103, S104, S105, S106 and S107 are performed for all pixels as n=n+1 since the maximum value $E_{max}$ is equal to or more than the predetermined value X. Namely, the residual energy $E_{n-1}$ is multiplied with the inverse number of the barycenter value Ga of the point spread function (the maximum value of the fluctuation-factor information data G) to obtain the transfer pixel energy $F_n$ (step S102.) Next, the transfer pixel energy $F_n$ is transferred to the restored image data region to obtain the new restored data $R_n$. Namely, the transfer pixel energy $F_n$ is added to the restored data $R_{n-1}$ restored until the previous numbers (n−1) and remained in the restored image data region to obtain the new restored data $R_n$. Further, the pixel energy amount $T_n$ obtained by convolving the transfer pixel energy $F_n$ with the fluctuation-factor information data G (step S104) is removed from the initial image data region to obtain the new residual energy $E_n$ (step S105.)

These steps S102, S103, S104, and S105 are performed in series for all pixels remained in the initial image data region. Then, the maximum value $E_{max}$ of the residual energy amount for each pixel is memorized (step S106.) Further, it is determined whether the maximum value $E_{max}$ of the residual energy amount is under the predetermined value X or not (step S107.) Steps S102, S103, S104, S105, S106 and S107 are repeated as "n=n+1" if the maximum value $E_{max}$ is equal to or more than the predetermined value X. If the maximum value $E_{max}$ becomes under the predetermined value X, it is determined that the restored data $R_n$ gets to be sufficiently approximated to the original image data Img, then completing the restoring process (step S108.)

Figure 4:
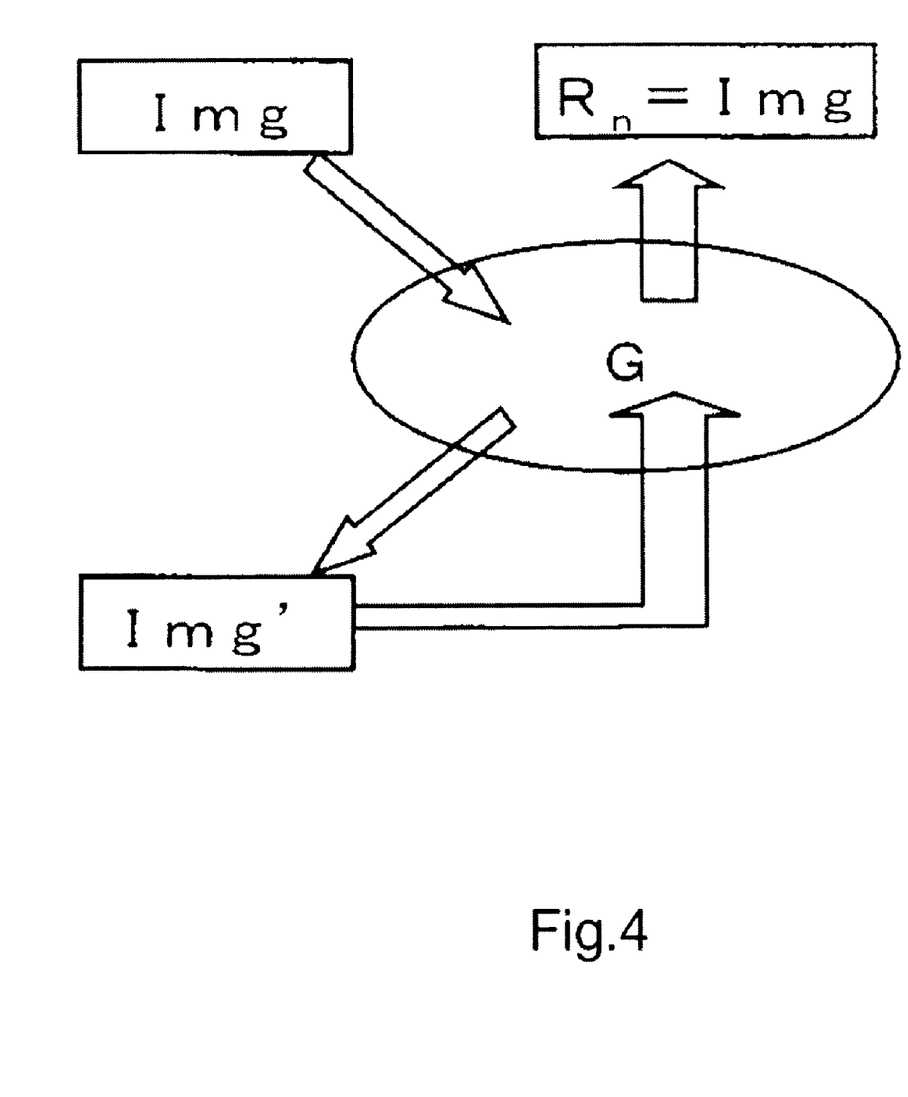
FIG. 4 is a diagram explaining a concept of the method processed by the processing unit of the signal processing device shown in FIG. 1.

A concept of restoring process against an image blur due to hand jiggling in the embodiment will be explained referring to FIG. 4. If the original image data Img is fluctuated to the initial image data Img' due to the fluctuation-factor information data G, the restored data $R_n$ is assumed to be theoretically approximated to the original image data Img by transferring all initial image pixel energies E for all pixels constituting the initial image data Img' to the restored image data region using the fluctuation-factor information data G as a same filter.

Next, details of a method of restoring an image blurred by hand jiggling (repetition of steps S102, S103, S104, 105, 106 and S107) will be explained referring to FIGS. 5, 6, 7, 8 and 9.

Restoring Algorithm

When no hand jiggling, light energy (pixel energy) corresponding to a predetermined pixel concentrates on the pixel during exposure. But when hand jiggling, light energy disperses to pixels blurred during exposure. Further, if the degree of hand jiggling during exposure is recognized, the way of making light energy dispersion during exposure is also recognized. Therefore, it is possible for the recognition to produce a non blurred image from a blurred image.

Figure 5:
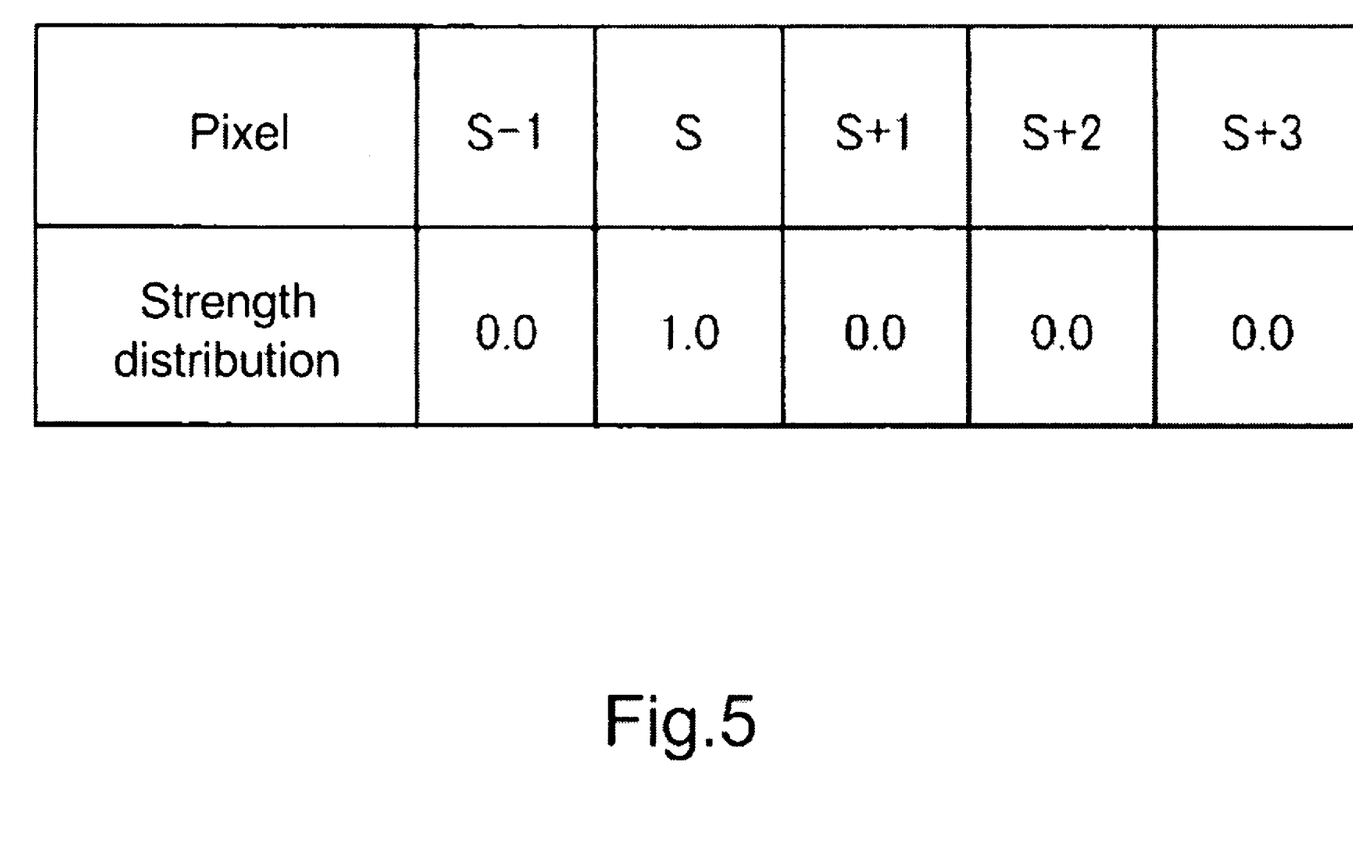
FIG. 5 is a chart concretely explaining the processing method shown in FIG. 3 as an example of hand jiggling and a table of energy concentration without hand jiggling.
Figure 6:
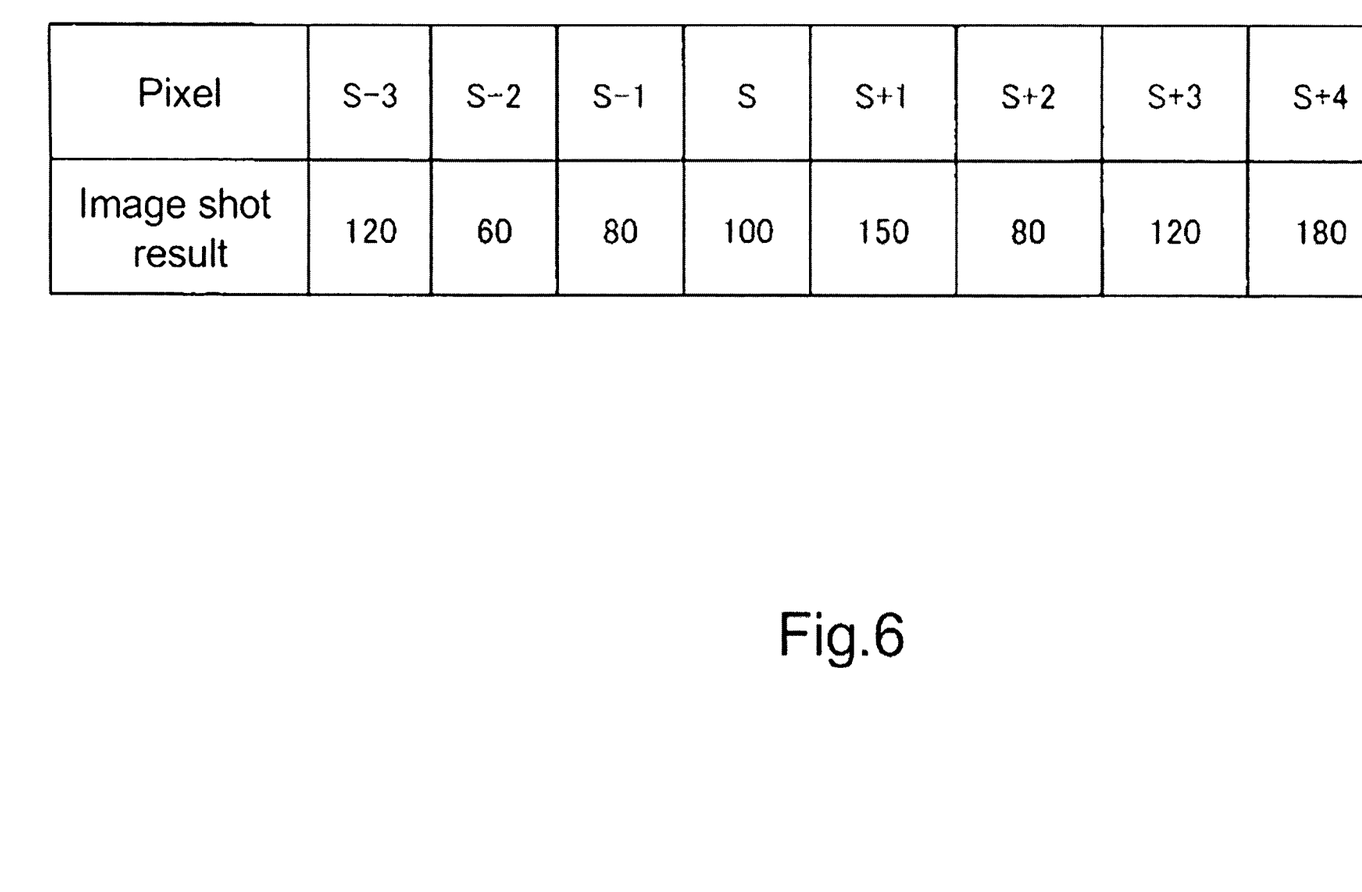
FIG. 6 is a chart concretely explaining the processing method shown in FIG. 3 as an example of had jiggling and a diagram showing image data without hand jiggling.

Details will be explained as a horizontal one dimension for simplicity. Pixels are numbered as S−1, S, S+1, S+2, S+3 ... from the left side in series. One pixel "S" is paid an attention. When no hand jiggling, energy during exposure is concentrated into the pixel, making the energy concentration become "1.0". This energy concentration is shown in FIG. 5. FIG. 6 shows the results of shot images under the above energy concentration. These results shown in FIG. 6 become the correct image data Img without deterioration. Here, each data is shown as 8 bits (0 to 255.)

Figure 7:
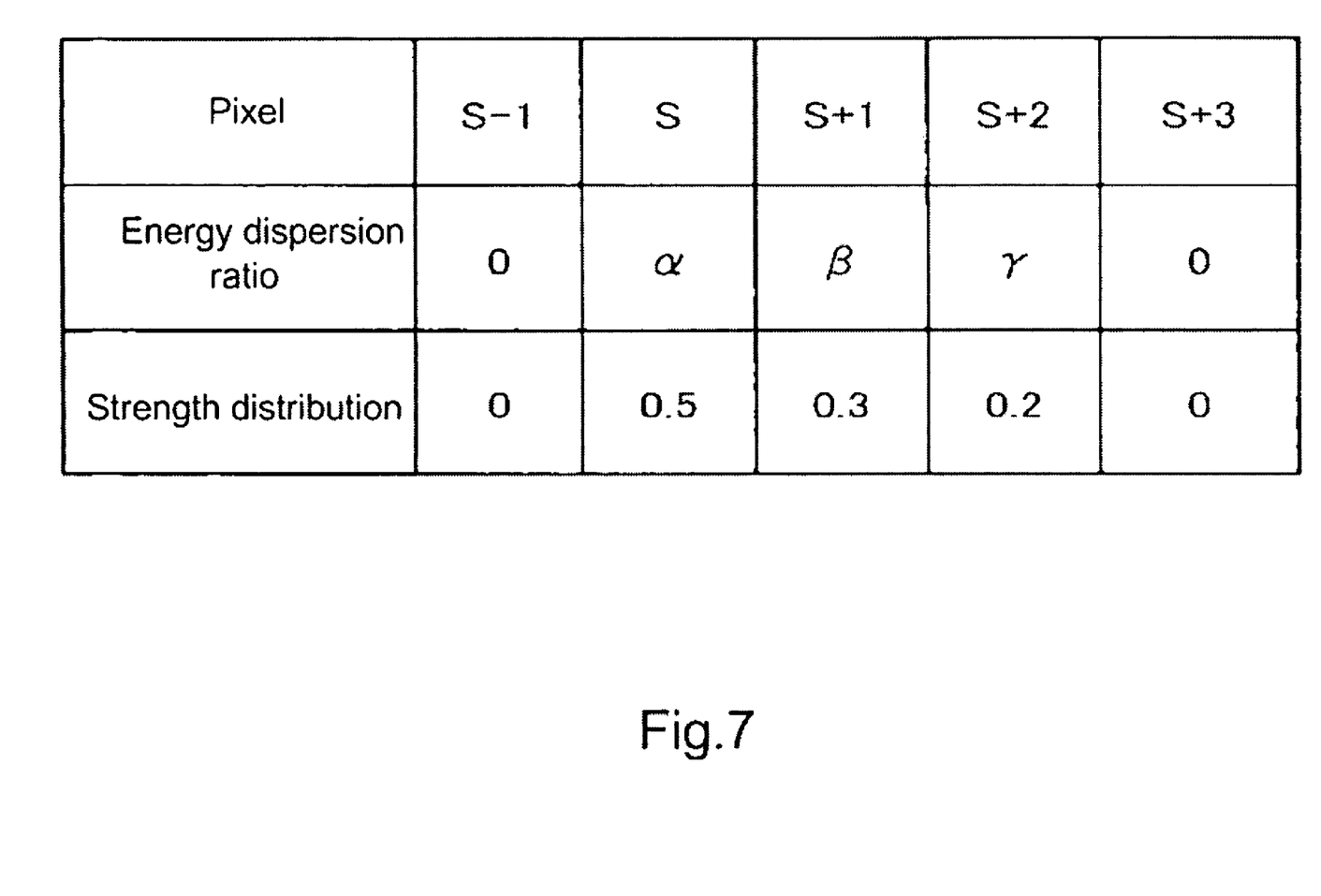
FIG. 7 is a chart concretely explaining the processing method shown in FIG. 3 as an example of had jiggling and a diagram showing energy dissipation when hand jiggling.

When hand jiggling is occurred during exposure, an image is supposed to be blurred to the Sth pixel during 50% of exposure time, the (s+1)th pixel during 30% of it and the (s+2)th pixel during 20% of it. The way of making energy dispersion is shown in the table of FIG. 7. This dispersion becomes the fluctuation-factor information data G. The barycenter value Ga of the point spread function is a value of a part where energy is mostly concentrated, namely "0.5" in a part blurred during 50% of the exposure time.

It is assumed that a blur is uniform for all pixels, there is no upper blur (no vertical blur) and a blur is spread within three pixels shown in FIG. 7. In such case, a state of the blur, namely a state of pixel energy dispersion for each pixel, is concretely shown in FIG. 8 for example. Namely, "120" of "S−3"th pixel is dispersed into "S−3"th pixel by "60", "S−2"th pixel by "36" and "S−1" by "24" according to the dispersion ratio of the fluctuation factor information ratio G, which is fluctuation information, such as "α=0.5" "β=0.3" "γ=0.2" (shown in FIG. 7.) Similarly, the pixel energy "60" of the "S−2"th pixel is dispersed into the "S−2"th pixel by "30", the "S−1"th pixel by "18" and "S"th pixel by "12". Pixel energies of the other pixels are dispersed in a similar manner.

The relationship between the energy "A" of a specific pixel in the original image data Img and the energy "A'" of a pixel in the shot initial image Img' which corresponds to the specific pixel is generally expressed by the following formula (3).

$$A \times Ga = k \times A' \qquad (3)$$

Here, "k" is the component ratio of the pixel energy "A" included in the pixel energy "A'". The value of "k" can be arbitrarily set within the range of 0<k≦1 since it is unknown. The barycenter value Ga of the point spread function is a value of a part where energy is mostly concentrated. Hence, it is "α=0.5" as shown in FIG. 7 in the embodiment. "α" is the energy dispersion ratio of the energy "A" of a specific pixel in the original image data Img dispersed into the energy "A'" of a pixel, which corresponds to the specific pixel in the shot initial image Img', due to a blur. The formula (3) can be obviously applied to a value of α except "α=0.5" shown in FIG. 7. Further the formula (3) can be applied to a case when a blur is occurred in a range of pixel numbers which are under three pixels shown in FIG. 7 or exceeds such numbers. Further, the formula (3) can be applied to a case when the barycenter value Ga of the point spread function is located at "β" or "γ" shown in FIG. 7

Next, it is considered how the pixel energy is transferred from a pixel in the initial image data region to a specific pixel in the restored image data region. Here, the original image data Img is restored in the restored image data region. Hence, in order to obtain the energy "A" of the specific pixel in the original image data Img, the pixel energy in the initial image data region should be transferred to the specific pixel in the restored image data region corresponding to "A". Namely, "A=k×A'/α" is transferred to the specific pixel in the restored image data region corresponding to "A" from the initial image data region by the formula (3). Then, the pixel energy corresponding to "A" is removed from the initial image data region. At this time, the fluctuation-factor information data G is utilized in order to remove the pixel energy from the initial image data region without any inconsistencies as a whole. For example, if the specific pixel corresponding to "A" is the pixel "S" shown in FIG. 7, the pixel energy which should be removed from the pixel "S" in the initial image data region is "k×A'/α×α", the pixel energy which should be removed from the pixel "S+1" in the initial image data region is "k×A'/α×β" and the pixel energy which should be removed from the pixel "S+2" in the initial image data region is "k×A'/α×γ". Accordingly, the sum of these removed energies becomes the pixel energy amount "A" which was transferred to the pixel "S" in the restored image data region. In the embodiment, by setting "k=0.5", the detail of transferring a pixel energy will be explained hereafter.

Figure 8:
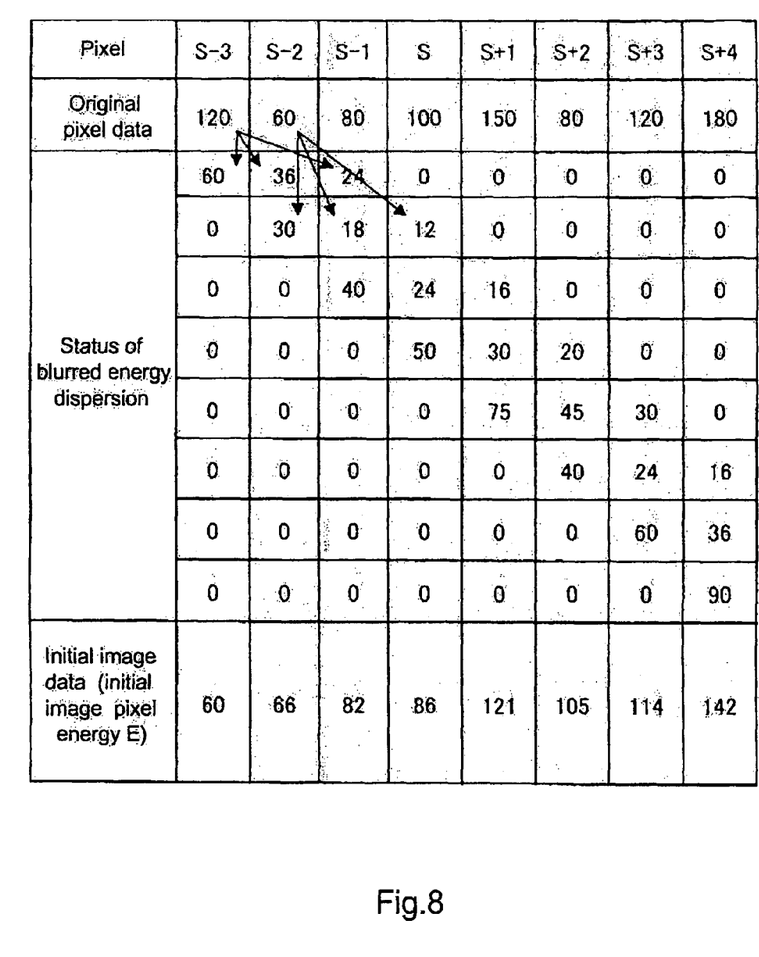
FIG. 8 is a chart showing an example of a state of had jiggling when dispersing energies of pixels showing in FIG. 7.

The initial image pixel energy "E" shown in step S101, the first step of repeating process, is also shown in FIGS. 8 and 9. In the pixel to initially be processed, the initial image pixel energy E is the energy $E_0$, an object to be processed. The energy $E_0$ is multiplied with inversed numbers of the barycenter value Ga of the point spread function in step S102 to obtain the transfer pixel energy $F_n$. Here, the pixel "S−3" is paid an attention for example. The barycenter value Ga of the point spread function of the initial image data (shot image data) ("E" in FIG. 9) is "0.5". "0.5×60/0.5=60" obtained by the formula (3) is transferred from the initial image data region to the pixel "S−3" in the restored image data region (step S103) ($F_1$(S−3) in FIG. 9.) Then, the pixel energy "60" is removed from the initial image data region. As the result, the restored image data ($R_1$(S−3) in FIG. 9) becomes "60", "0" . . . . Here, the fluctuation-factor information data G are "0.5", "0.3", and "0.2" described above. "0.5×60/0.5× 30=30" should be removed from the pixel "S−3" in the initial image data region, "0.5×60/0.5×0.3=18" should be removed from the pixel "S−2" and "0.5×60/0.5×0.2=12" should be removed from the pixel "S−1" ($T_1$(S−3) in FIG. 9). Hence, the energies "30" "18" and "12" are removed from the pixels "S−3", "S−2" and "S−1" respectively in the initial image data region (step S104.) At this time, the transferred component is removed from the residual energy amount $E_n$ for each pixel in the initial image data region. Hence, the residual energy amount $E_n$ for the pixel "S−3", the pixel "S−2" and the pixel "S−1" become "30", "48" and "70" respectively. But the residual energy amount $E_n$ for other pixels are still "86", "121", "105", "114" and "142" (step S105) ($E_1$(S−3) in FIG. 9.)

Next, if the pixel "S−2" is paid an attention, the energy "48" (=66−18) is currently remained as the energy $E_0$, an object to be processed. The process applied to the pixel "S−3" is also applied to the pixel "S−2". The energy "48" is transferred to the pixel S−2" in the restored image data region from the initial image data region ($F_1$(S−2) in FIG. 9). The restored data R1 at the pixel "S−2" in the restored image data region becomes "48" and the restored image data ($R_1$(S−2) in FIG. 9) become "60" "48" "0" . . . . Further, the energies "24" "14.4" and "9.6" are removed from the pixels "S−2", "S−1" and "S" respectively in the initial image data region. As the result, the transferred component is removed from the residual energy amount $E_n$ for each pixel in the initial image data region ("$T_1$(S−2) in FIG. 9). Hence, the residual energy amount $E_n$ for the pixel "S−3", the pixel "S−2", the pixel "S−1" and the pixel "S" become "30", "24" "55.6" and "76.4" respectively. But the residual energy amount $E_n$ for other pixels are still "121", "105", "114" and "142" ($E_1$(S−2) in FIG. 9.)

Next, the pixel "S−1" is paid an attention and the process applied to the pixel "S−3" is also applied to the pixel "S−1". The energy "55.6" (=82−12−14.4) is currently remained as the energy $E_0$, an object to be processed. Then, the energy "55.6" is transferred to the pixel "S−1" in the restored image data region from the initial image data region ($F_1$(S−1) in FIG. 9). The restored data R1 at the pixel "S−1" in the restored image data region becomes "55.6" and the restored image data ($R_1$(S−1) in FIG. 9) become "60" "48" "55.6" "0" . . . . Further, the energies "27.8" "16.68" and "11.12" are removed from the pixels "S−1", "S" and "S+1" respectively in the initial image data region. As the result, the transferred component is removed from the residual energy amount $E_n$ for each pixel in the initial image data region ("$T_1$(S−1) in FIG. 9), which is shot image data. Hence, the residual energy amount for the pixel "S−3", the pixel "S−2", the pixel "S−1", the pixel "S" and the pixel "S+1" become "30", "24" "27.8", "59.72" and "109.88" respectively. But the residual energy amount for other pixels are still "105", "114", and "142" ($E_1$(S−1) in FIG. 9.)

Accordingly, pixel energies for all pixels are transferred in series described above. During the first time (n=1) processing, the initial image pixel energies E for all pixels "S−3", "S−2" "S−1" . . . "S+4" are not transferred to the restored image data region, but the residual energy amount $E_n$ for each pixel in the initial image data region is remained as a large value. Here the maximum value "$E_{max}$" of a residual energy amount ("53.06" in the pixel "S+4") is memorized in a memory of the controller 4 (step S106.) Then, it is determined whether the maximum value $E_{max}$ of the residual energy amount is under the predetermined value X ("5" for example in the embodiment) or not (step S107.) As the result of the above processing, the maximum value "$E_{max}$" of a residual energy amount becomes $E_{max}$>X. Then, the similar process of transferring pixel energy is performed as a second time (n=2) while the residual energy ("$E_1$(S+4)" in FIG. 9) is an object to be processed. Then, the similar processes are repeated until "$E_{max}$">X is satisfied (namely until the residual energy amount $E_n$ is approximated to "0".)

Here, in the specific pixel of FIG. 9, as the result of transferring process, namely as the result of transferring the transfer pixel energy $F_n$, the restored data $R_n$ may exceed the predetermined upper limit value or the residual energy amount $E_n$ may become a minus value. The occurrence of such state is caused by setting the transfer pixel energy $F_n$ to be an inappropriate value. Hence, a method of adjusting the transferred value without inconsistency as a whole even facing the above state will be explained.

Method of Adjusting Transferred Value

Regarding a pixel in which the residual energy amount becomes a minus value, the transfer pixel energy $F_n$ is not transferred to the restored image data region, but the previous processed value is used in situ and provided for the next transferring process. The pixel energy removed at that time is expected not to be an inappropriate value by such processing. In the next processing, the residual energy amount of the pixels in the periphery becomes small and the pixel energy value removed from the pixel which has been a minus value per se, namely the removed pixel energy value becomes small comparing to the previous processing. Hence, there will be high probability that the residual energy amount becomes more than "0". However, in case when the previous value is used in situ at the time when the pixel "S" becomes a minus value, the processing does not indefinitely converge without restoring when the residual energy amount for processed pixels such as the pixels "S−2" "S−1" and others approach "zero". Hence, in such case, it is desirable that the restored values of the pixel "S−2", "S−1" and the like be adjusted.

Figure 10:
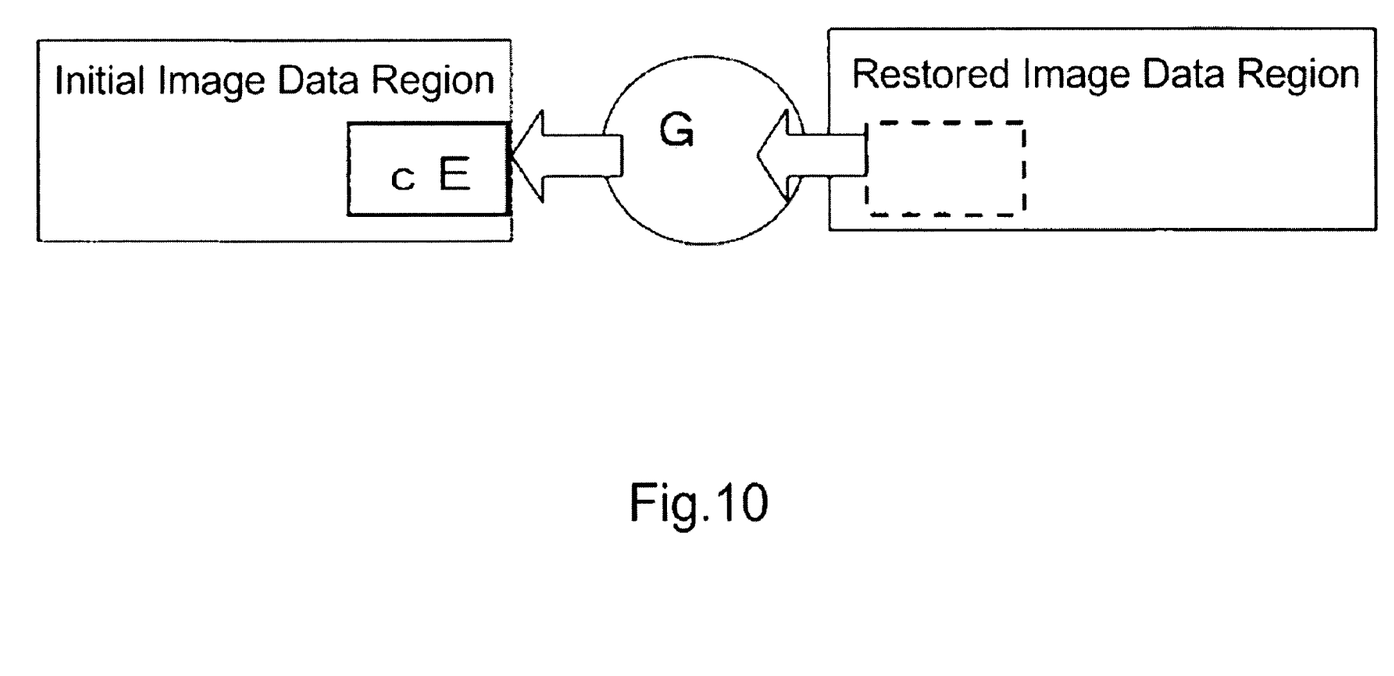
FIG. 10 is a conceptual view showing a method of adjusting a transfer value during transfer process when the processing method shown in FIG. 3 is performed.

FIG. 10 is a diagram showing a concept of a way of adjusting such values after transferring. A part of the pixel energy already transferred to the restored image data region is returned as compensation component (called as compensation energy cE) to the initial image data region so as to make the residual energy amount $E_n$ be more than 0. At this time, the compensation energy cE is convolved with the fluctuation-factor information data G and returned to the initial image data region. Accordingly, these processes can adjust the transferred value without inconsistency.

According to the signal processing unit 1 of the embodiment, any one of the numbers of processing and the reference value for determining whether the residual energy amount $E_n$ approaches "0" or not, or both of them can be set in advance during step S104 and S107. The numbers for processing can be fixed to be arbitrary such as 20 times or 50 times for example. Further, the reference value for determining whether the residual energy amount $E_n$ approaches "0" or not, is set to be "5" among 8 bits (0 to 255) for halting the processing. If the energy becomes equal to or less than 5, the processing can be completed. Otherwise, if the value is set to be "0.5" and the data becomes equal to or less than "0.5", the processing can be completed. The value can be arbitrarily fixed. When inputting both the numbers of the processing and the reference value for determining, it is desirable that the processing be halted if any one of them is satisfied. Here, if setting the both is possible, the reference value for determining may be prioritized and the predetermined numbers of the processing can be further repeated if the energy does not become within the range of the reference value for determining by repeating predetermined numbers.

A according to the embodiment, data recorded in the recording area of the processing unit 4 instead of information stored in the factor information storing unit 7 is used. But, data of existed deterioration factors stored in the unit 7 such as optical aberration and lens distortion may be used. In this case, in the processing shown in FIG. 3, for example, it is preferable that the processing be performed by combining hand jiggling information with optical aberration information as one blur information. Otherwise, an image may be stabilized by using optical aberration information after completing the processing with using hand jiggling information. Further, an image may be corrected or restored by movement factors such as only hand jiggling information at the time of shooting without setting the factor information storing unit 7.

Further, if the numbers of repetition are automatically set or fixed by the signal processing device 1, such numbers may be changed depending on the fluctuation-factor information data G. When data of one pixel is dispersed to many other pixels by blurring, the numbers of repetition may be increased for example. But when the dispersion is small, the numbers of repetition may be decreased.

Further, when the restored data $R_n$ is produced as an output image, data may go out of the region specified as an image to be restored depending on the fluctuation-factor information data G. In such case, data going out of the region should be input to an opposing side. Further, if data comes from the outside of the region, the data may be brought into an opposing side. If data allocated to pixels located lower than the most bottom position of the region where the pixel XN1 is located is generated for example, the location becomes out of the region. In such case, the data will be allocated to the pixels X11 at the most top position directly above the pixel XN1. The pixel N2 adjacent to the pixel XN1 will be similarly allocated to the pixel X12 (adjacent to the pixel X11) at the most top position and the most top column.

The restoring algorithm in this embodiment can make the data region held by the signal processing unit 1 small. The reason of it is that the necessary data region for restoring process is only the initial image data region and the restored image data region. Further, during restoring process, the restoring algorithm in this embodiment only repeats transferring the pixel energy using the existed fluctuation-factor information data G, making it possible to perform quick processing. Further, the data region may not be set as permanent, but as temporary for processing.

The signal processing device 1 of the embodiment was explained above. But, various modifications of them can be available within the spirit of the invention. For example, the processing unit 4 performs processes with software. But, hardware composed of parts sharing their workload together may be used for processing. Further, the fluctuation-factor information data G may include not only data of deterioration factors, but information simply varying an image or improving image quality. Further, the average value or the total sum of the residual energy amount $E_n$ may be compared with the predetermined value (X) instead of the maximum value "$E_{max}$" of a residual energy amount as the residual energy amount $E_n$. This comparison improves processing speed. Further, the plural numbers of the maximum value "$E_{max}$" of a residual energy amount and the average value or the total sum can be compared with the plural numbers of the predetermined values corresponding to each of these values.

Further, if the numbers of repetition are automatically set or fixed by the signal processing device 1, such numbers may be changed depending on the fluctuation-factor information data G. When data of one pixel is dispersed to many other pixels by blurring, the numbers of repetition may be increased for example. But when the dispersion is small, the numbers of repetition may be decreased.

An object to be processed is an image data in the above embodiments. But, the concept or the method disclosed in these embodiments may be applied to restoring processes for various digital data. They may be applied to restoring digital voice data, restoring seismic waves and the like. Further, in the embodiments described above, a blur is occurred in a similar manner at each of places in image data. But, the concept or the method shown in the embodiment can be applied to image data in which a blur is differently occurred at each of places in image data or non-linear data such as gamma correction.

Further, the above methods may be programmed. Further, such programmed content may be stored in a memory such as a compact disc (CD), DVD, a universal serial bus (USB) and read by a computer. In this case, the signal processing device 1 may include a means for reading the program stored in the medium. Further, the programmed content may be input to a server out of the signal processing device, down-loaded and used if it is necessary. In such case, the signal processing device 1 may include a communication means down-loading the program stored in a medium.

The invention claimed is:

1. A signal processing device comprising a processing unit that restores one of a signal before fluctuation, a signal which should have been intrinsically obtained, and signal data which is approximated to these signals (these signals are called an original signal) from an initial signal (called fluctuated data) which has fluctuated like deterioration, wherein:
 a fluctuated data region storing fluctuated data and a restored data region storing signal data (restored data) restored every restoring process are installed, wherein
 the processing unit repeats the following processing in order to produce data formed in the restored image data region at the completion of the processing as original signal data:
  transferring energy of the fluctuated data from the fluctuated data region to the restored data region using fluctuation-factor information data, which is a fluctuation factor so as to produces the restored data; and
  substituting residual data remained in the fluctuated data region by the transferring with the fluctuated data.

2. The signal processing device according to claim 1, wherein during repeating process, the energy transferred to the restored data region is added to the restored data which has been already stored in the restored data region every repeating and the residual data is approximated to zero.

3. A signal processing device comprising a processing unit that restores original signal data including a plurality of elements from fluctuated data including a plurality of elements, wherein:
 a fluctuated data region storing fluctuated data and a restored data region storing signal data (restored data) restored every restoring process are installed, wherein
 the processing unit repeats the following processes for each pixel:
  transferring elemental energy existed in one element of the fluctuated data from the fluctuated data region to the restored data region using the barycenter of response characteristic function held by fluctuation-factor information data, which is a fluctuation factor:
  removing the energy corresponding to the transferred energy using fluctuation-factor information data from the fluctuated data region:
  applying the previous processes to other element in series so as to produce the restored data in the restored data region; and
  substituting residual data remained in the fluctuated data region by the transferring with the fluctuated data, wherein:
 the processing unit adds the element energy, which is transferred to the restored data region, to the restored data every repeating; approximates the residual data to zero; and produces data formed in the restored image data region at the completion of processing as original signal data.

4. The signal processing device according to claim 1, wherein the processing unit halts the repetition of the processing if the value of the residual energy becomes equal to or less or smaller than a predetermined value.

5. The signal processing device according to claim 1, wherein the processing unit halts the repetition of the processing if the number of the repetition becomes a predetermined number.

6. The signal processing device according to claim 1, wherein the processing unit halts the repetition of the processing if the energy value of the residual data at the time when the numbers of the repetition reach predetermined numbers, becomes equal to or less or smaller than a predetermined value and performs further repetition by the predetermined number if the energy value of the residual data becomes equal to or more or larger than the predetermined value.

7. A signal processing device comprising a processing unit that restores original signal data including a plurality of elements from fluctuated data including a plurality of elements, wherein:
 a fluctuated data region storing fluctuated data and a restored data region storing signal data (restored data) restored every restoring process are installed, wherein:
 the processing unit repeats the following processing:
  transferring energy of the fluctuated data from the fluctuated data region to the restored data region using fluctuation-factor information data, which is a fluctuation factor;
  removing the energy corresponding to the transferred energy using fluctuation-factor information data from the fluctuated data region;
  applying the previous processes to other element in series so as to produce the restored data in the restored data region;
  halting the processing if the value of the residual energy remained in the fluctuated data region through the transfer is equal to or less or smaller than a predetermined value and treats the restored data as the original signal data, and
  substituting the residual data with the fluctuated data if the amount of the residual energy is equal to or more or larger than the predetermined value, wherein
 the processing unit adds the element energy, which is transferred to the restored data region, to the restored data every repeating.

8. The signal processing device according to claim 7, wherein the processing unit halts the repetition of the processing if the numbers of the repetition become predetermined numbers.

9. The signal processing device according to claim 7, wherein the processing unit compares one of or plurality of the maximum value, an average value and a total sum of the residual data held by each pixel with the predetermined value.

10. The signal processing device according to claim 1, wherein during transferring element energy any times of repetition, the processing unit does not transfer the element energy in a specific time if the element energy value in any elements of the residual energy is under zero and transfers the element energy in the following time instead or corrects the transfer value in the specific time.

11. The signal processing device according to claim 1, wherein the signal data is image data.

12. The signal processing device according to claim 3, wherein the processing unit halts the repetition of the processing if the value of the residual energy becomes equal to or less or smaller than a predetermined value.

13. The signal processing device according to claim 3, wherein the processing unit halts the repetition of the processing if the number of the repetition becomes a predetermined number.

14. The signal processing device according to claim 3, wherein the processing unit halts the repetition of the processing if the energy value of the residual data at the time when the numbers of the repetition reach predetermined numbers, becomes equal to or less or smaller than a predetermined value and performs further repetition by the predetermined number if the energy value of the residual data becomes equal to or more or larger than the predetermined value.

15. The signal processing device according to claim 3, wherein during transferring element energy any times of repetition, the processing unit does not transfer the element energy in a specific time if the element energy value in any elements of the residual energy is under zero and transfers the element energy in the following time instead or corrects the transfer value in the specific time.

16. The signal processing device according to claim 7, wherein during transferring element energy any times of repetition, the processing unit does not transfer the element energy in a specific time if the element energy value in any elements of the residual energy is under zero and transfers the element energy in the following time instead or corrects the transfer value in the specific time.

* * * * *